United States Patent [19]

Franz

[11] 4,084,605
[45] Apr. 18, 1978

[54] ADDITIVE METERING SYSTEM USING A CENTRIFUGAL PUMP

[76] Inventor: Norman C. Franz, 4665 West Tenth Ave., Vancouver, British Columbia, Canada

[21] Appl. No.: 711,090

[22] Filed: Aug. 2, 1976

[51] Int. Cl.² ............................................. G05D 11/00
[52] U.S. Cl. ................................. 137/101.11; 137/114
[58] Field of Search ................ 137/13, 88, 98, 101.11, 137/114, 111; 417/80, 83, 87, 182

[56] References Cited

U.S. PATENT DOCUMENTS

| | | | |
|---|---|---|---|
| 1,415,406 | 5/1922 | Scanes | 417/182 |
| 2,680,715 | 6/1954 | Cook | 137/114 |
| 2,823,613 | 2/1958 | LeDuc | 417/80 |
| 3,043,107 | 7/1962 | Magnus | 417/87 |
| 3,057,540 | 9/1962 | Shumaker | 137/101.11 |
| 3,524,367 | 8/1970 | Franz | 83/53 |
| 3,646,694 | 3/1972 | Beck, Jr. | 417/80 |
| 3,648,714 | 3/1972 | Laveau | 137/88 |
| 3,763,878 | 10/1973 | Harden | 137/114 |
| 3,817,264 | 6/1974 | Kilayko | 137/111 |
| 3,820,714 | 6/1974 | Erickson et al. | 137/13 |

*Primary Examiner*—Martin P. Schwadron
*Assistant Examiner*—H. Jay Spiegel
*Attorney, Agent, or Firm*—Ian C. McLeod

[57] ABSTRACT

A novel system for metering a relatively viscous fluid into a less viscous fluid using a centrifugal pump is described. In particular, a novel valve for use in the system including a fluid pressure responsive means to actuate a needle valve which is slideable into an orifice for control or metering of the viscous fluid is described. The valve meters decreasing small amounts of the viscous fluid in direct relation to the increased pressure developed at the delivery end of the centrifugal pump because of the selection of the angle of the point of the needle and its relationship to the orifice. The system is particularly adapted to metering viscous polymer containing fluids, including microdispersions of polymers as solutions or true solutions into water in very small amounts thereby reducing friction and increasing fluid flow in delivery conduits such as fire hoses and the like.

6 Claims, 2 Drawing Figures

ADDITIVE METERING SYSTEM USING A CENTRIFUGAL PUMP

SUMMARY OF THE INVENTION

The present invention relates to a novel system for metering a viscous additive fluid into a less viscous fluid in small amounts using a centrifugal pump. In particular a novel valve for use in this system is described.

PRIOR ART

The prior art has described providing small amounts of relatively high molecular weight polymers in fluids particularly water as drag or friction reducing agents in relatively low fluid pressure conduits such as fire hoses. In addition, in my U.S. Pat. No. 3,524,367, I have described the use of such polymer additives in liquids which are used to generate cohesive high velocity liquid jets. In general, the polymers are dispersed in a liquid and form viscous fluids which are then metered into the delivery conduits in very small amounts usually in parts-per-million. The problem has been that there is a need for a precise, simple and economical means for introducing the viscous polymer fluid into the water to be delivered in the hose or to the high pressure pump for fluid jets using a centrifugal pump. This delivery is particularly a problem where the flow rate and fluid delivery pressure varies with use as with fire hoses. Particularly suitable polymers for these uses are described in U.S. Pat. Nos. 3,624,019, 3,734,873 and 3,826,771.

It is therefore an object of the present invention to provide a system which utilizes a centrifugal pump to deliver a precise amount of a viscous fluid into a less viscous fluid regardless of the variance in fluid flow rate and thus delivery pressure from the pump. The system is lightweight, inexpensive and adapted to field applications where portable equipment is necessary such as with equipment used for forest fires or on municipal fire trucks. These and other objects will become increasingly apparent by reference to the following description and to the drawing.

IN THE DRAWING

Figure 1:
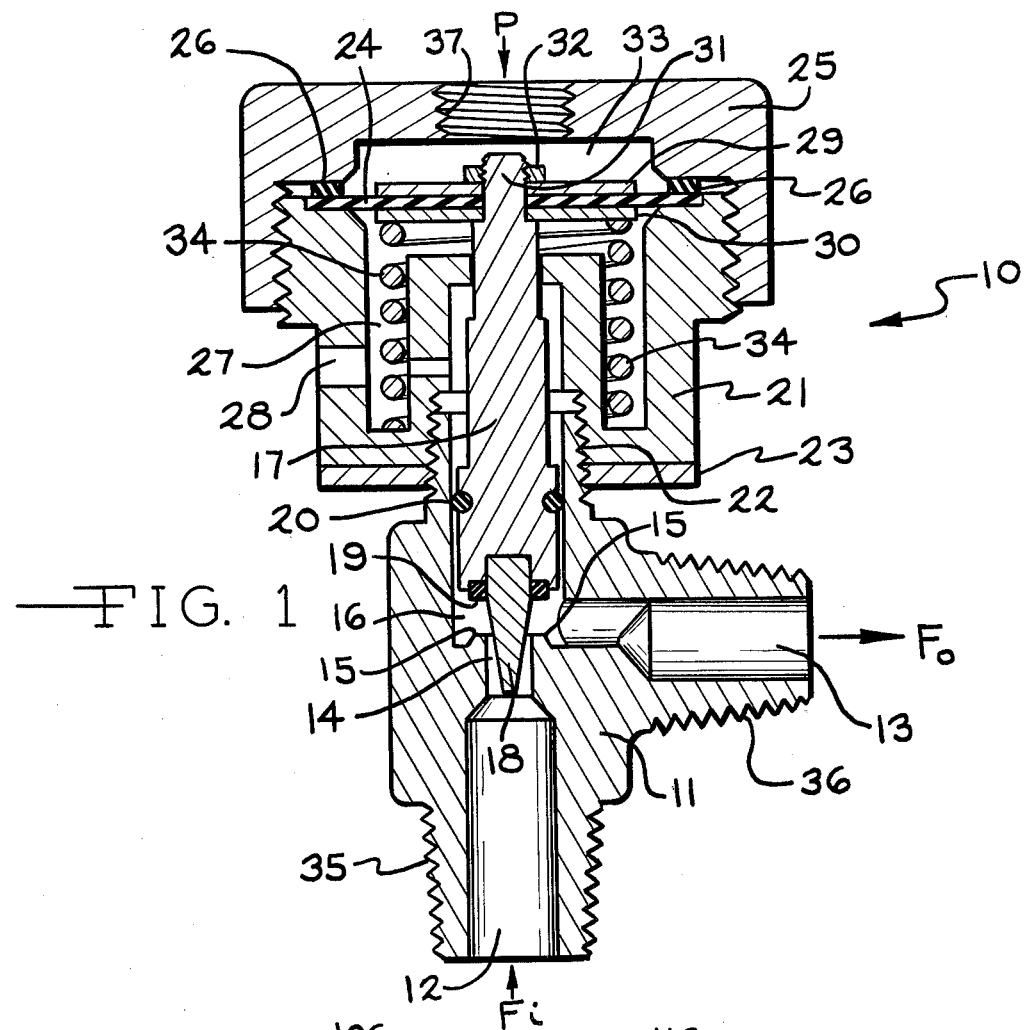
FIG. 1 is a front cross-sectional view of a metering valve according to the present invention and particularly illustrating a needle valve which is responsive to increasing pressure (P) to restrict viscous fluid flow (F$i$ to F$o$ or in reverse) through an orifice into which the needle projects.

The present invention relates to an additive metering system for dispersing a viscous fluid into a less viscous fluid which comprises: a centrifugal pump having a suction inlet and at least one discharge outlet stage; a first conduit connected to the suction inlet for intake of a less viscous fluid to which an additive viscous fluid is to be mixed; a second conduit connected between the suction inlet and an outlet stage of the centrifugal pump; a venturi mixer with an upstream and downstream side between the venturi provided in the second conduit such that fluid flow is towards the first conduit; a third fluid conduit connected into the downstream side of the venturi and adapted to draw fluid from a supply of a viscous fluid; a fluid pressure responsive valve in the third conduit adapted for metering decreasing or increasing amounts of a viscous fluid in direct relation to the pressure on a fluid pressure responsive means which moves a linearly slideable needle valve having a point taper angle between about 1° and 20° into an orifice for constricting fluid flow through the valve; and, a fourth conduit connected between a pump outlet stage and the fluid pressure responsive means in the pressure sensitive valve.

The present invention also relates to a fluid pressure responsive metering valve which comprises: a housing having an inlet passage and an outlet passage adapted for flow of a viscous fluid to be metered through the housing; and orificial opening between said passages adapted to constrict fluid flow and with an enlarged chamber adjacent the inlet or outlet side of the opening; a valve stem slideably mounted in said housing a portion of which is sealed in the chamber for movement towards and away from the opening with another portion of the stem extending outside the chamber; a needle point shaped projection from said stem the point of which is adapted to slide into the opening and at the base of the point to close the opening and prevent fluid flow; a second housing adapted to be attached to a source of fluid pressure with an internal passageway surrounding the portion of the stem outside the chamber; and a fluid pressure responsive means mounted on the stem inside the second housing in moveable fluid sealed engagement with the passage; and resilient means in said second housing urging said fluid pressure responsive means and stem to a position which is away from said opening to permit full viscous fluid flow and wherein the needle point moves into the opening to restrict viscous fluid flow with increasing fluid pressure on the fluid pressure responsive means.

In general the present invention utilizes a linearly slideable needle valve moved by a fluid pressure responsive means preferably a flexible fuel pump type diaphragm or a piston and which is responsive to the centrifugal pump outlet pressure. The pump can be tapped at any outlet stage; however, preferably it is at the first stage. The valve needle moves a very short distance into an orifice in order to decrease the amount of viscous fluid flow through the opening by constriction of viscous fluid flow. The needle valve point must have a very shallow taper point angle (one-half of included angle of the point) of between about 1° and 20° in order to be accurately responsive to the pressure of the centrifugal pump in metering the viscous fluid. If the taper angle is more than about 20°, the valve does not work accurately. Less than about 1° is impractical in use.

In metering a viscous fluid the diaphragm and needle valve will move a very small distance of between 0.100 and 0.250 inch (0.254 to 0.635 cm), preferably a distance of about 0.150 inch (0.38 cm) between opening and closing, with a 9° taper angle on the point and with a pump outlet stage pressure of between about 1 and 100 pounds/sq inch (0.07 to 7.03 kg per cm). The orifice or opening in the valve preferably has an open area of between about 0.005 and 0.049 sq inch (0.032 to 0.317 sq. cm) and is preferably round with a diameter between about 0.080 and 0.250 inch (0.203 to 0.635 cm). The orifice throat length is preferably between about 0.125 and 0.375 inch (0.32 to 0.95 cm). This valve accurately delivers the viscous polymer in amount of parts per million.

The high molecular weight polymer fluid has viscosities between about 500 and 5,000 centipoises as measured by a Brookfield L.V. viscometer with a No. 2 spindle at 6 rpm and 20° C. Some such fluids are shear thinning and thus show much higher viscosities at lower spindle rpm's.

SPECIFIC DESCRIPTION

Referring to FIG. 1, a preferred form of the metering valve 10 is shown. A housing 11 is provided having an inlet passage 12 and an outlet passage 13 for viscous fluid flow (Fi to Fo or in reverse). The passages 12 and 13 are preferably at an angle to each other, preferably a right angle, as shown in FIG. 1. A circular opening 14 is provided connecting the passages 12 and 13. The opening 14 has rounded lips 15 which tend to smooth fluid flow. A chamber 16 is provided in the housing 11 at the end of the passage 13 into which is slideably mounted a needle valve stem 17. A point 18 of the stem 17 extends into the opening 14 and has a taper angle of about 9°. A resilient washer or ring 19 is mounted adjacent the point 18 and abuts on the lips 15 when the valve stem 17 is moved into its extended or closed position. The stem 17 also supports and positions a ring seal 20 to prevent viscous fluid leakage around the stem 17. The stem 17 opposite the point 18 extends from the chamber 16 into a second housing 21 which is secured to the housing 11 by threads 22 and lock nut 23 which provides for positioning of point 18 in opening 14. A flexible diaphragm means 24 is mounted on the stem 17 and is in sealed engagement between housing 21 and a cap 25 with the aid of a ring gasket 26 forming internal passageway 27 which is vented through opening 28 in the housing 21 in a conventional fuel pump type assembly. The diaphragm 24 is centrally supported on either side by disks 29 and 30 which are mounted on the threaded end 31 of the stem 17 and held in place by nut 32. The cap 25 is provided with a fluid opening 33 and positions, locates and seals the diaphragm 24, and thus the needle valve 17, in relation to the opening 14. A coil spring 34 or other resilient means is provided in the housing 21 to urge the diaphragm means 24 towards the cap 25 to maintain the needle valve 17 in its fully open position before fluid pressure is applied to the diaphragm 24. As shown in FIG. 1, the diaphragm 24 is about midway between its fully open and fully closed position which is as it would be when partially pressurized. Threaded conduits (shown in FIG. 2) can be mated to the external threads 35 and 36 on the housing 11 and the internal threads 37 in the cap 25.

As can be seen from FIG. 1, increases in fluid pressure (P) on the diaphragm 24 moves the stem 17 and point 18 into closer spaced relation to the lips 15 of the opening 14, thus constricting fluid flow between the passages 12 and 13. The relative amount of movement of the point 18 is very small so as to provide accuracy and rapidity of response. It is important that the passage 12 in the housing 11 be free of sharp bends in the fluid flow path which are in closely spaced relation to the opening 14 since this has been found to adversely affect the precision of the metering by the valve 10. It has been found that the valve meters equally effectively when the direction of fluid flow is reversed (Fo to Fi).

Figure 2:
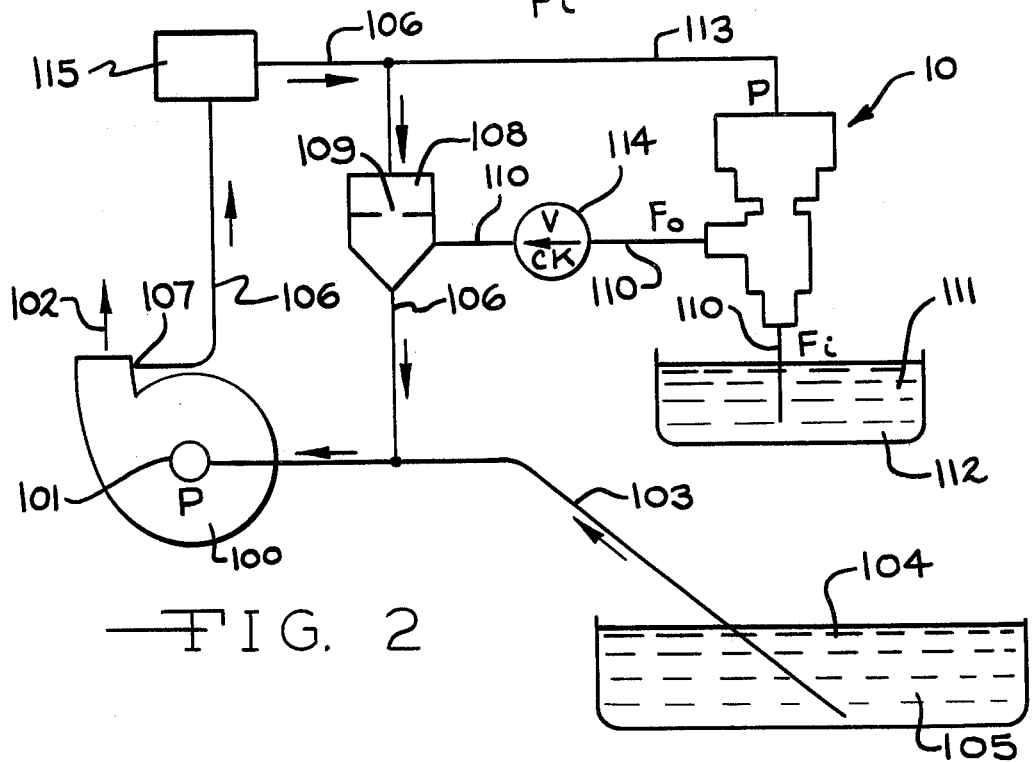
FIG. 2 is a schematic view of the metering system of the present invention particularly illustrating the metering valve of FIG. 1 in the system which adds small but precise amounts of a viscous fluid per unit volume into the suction inlet of a centrifugal pump which amounts increase or decrease as a direct function of the fluid delivery rate from the outlet of the pump.

FIG. 2 illustrates the use of the valve 10 in the setting of a system for metering a viscous fluid. A centrifugal pump 100 having a suction inlet 101 and a discharge outlet 102 is provided. Preferably the pump 100 has four stages. A first conduit 103 is connected to the inlet 101 for intake of a less viscous fluid 104 from a source 105 to which a viscous fluid is to be added. A second conduit 106 is provided between the suction inlet 101 and an outlet stage 107 of the pump 100. Preferably in a multistage pump 100, the stage outlet 107 to which conduit 106 is connected is the first stage. A venturi mixer 108 (preferably a simple laboratory type aspirator) is provided in conduit 106 having a conventional venturi orifice or opening 109 (about 0.15 inch; 0.38 cm in diameter). On the downstream side of the opening 109, a third conduit 110 is connected leading from a supply of viscous fluid 111 in a tank or source 112. The valve 10 is positioned in the line 110 with the inlet 12 leading from the tank 112 and the outlet 13 leading to the mixer 108 although it can be used in reverse. A fourth conduit 113 is connected to the pump 100 first stage outlet 107 and to the opening 33 in the cap 25 (FIG. 1) of the valve 10. A check valve 114 is provided in conduit 110 to prevent fluid flow back into the tank 112. A manually adjusted valve 115, such as a needle valve, is optionally provided to regulate the fluid flow to the venturi mixer 108 to the extent it is not regulated by the cross-section of the conduit 106.

In operation, so long as the pump 100 is delivering fluid at capacity at a constant pressure $P_1$ then the spring 34 pressure on the diaphragm 24 maintains the needle valve 17 in its most open position. As fluid flow from the pump 100 is reduced and the pressure $P_2$ increases, the point 18 on the needle valve 17 moves into the opening 14 to restrict viscous fluid addition. If the fluid flow from the pump 100 is stopped and the pressure $P_3$ reaches its maximum, the needle valve stem 17 moves to its closed position and seats the ring 19 onto the lips 15 to stop viscous fluid addition. The resilient means or spring 34 compression is selected to accommodate the variations of $P_3 > P_2 > P_1$ in a relatively linear fashion over the pump 100 pressure range.

With this system a small amount of fluid output from the pump 100 is recirculated to pick up the viscous solution. It is particularly adapted to multi-stage portable fire fighting pumps having a pump 100 discharge pressure varying between that at free flow and 300 psi (21.1 kgm/cm$^2$) and a flow rate at shut off up to 90 gallons per minute (341 liters per minute). The results of the test with the preferred metering valve (9° taper angle; 0.38 cm round orifice) with such a pump are shown in Table 1.

TABLE 1

| Pressure on Diaphragm psi (kg/cm$^2$) | Flow rate of a Viscous Polymer[1] (cc/min) |
| --- | --- |
| 52 (3.64) | 10 |
| 47 (3.29) | 20 |
| 43 (3.01) | 30 |
| 39 (2.73) | 40 |
| 35 (2.45) | 50 |
| 31 (2.17) | 60 |
| 28 (1.96) | 70 |
| 21 (1.47) | 80 |
| 5 (0.35) | 90 |

[1]Nalco Chemical Company BX 596$_{t.m.}$ vinyl addition polymer dispersion.

Into this system, the present invention can accurately meter a relatively constant 25 to 100 parts per million of a viscous fluid. The pressure range of metered flow of the viscous fluid can be controlled by: (1) selection of a spring for the diaphragm which requires a minimum pressure to begin to restrict polymer addition; and, (2)

constrictions or orifices in the viscous fluid supply line which produce a pressure drop and reduces the viscous fluid flow to the metering valve as is known to those skilled in the art of pumping and metering of fluids. It has also been found that a four stage centrifugal pump will deliver 25 percent more flow at full delivery or free flow (110 gallons per minute) from 100 feet (30.5 meters) of a 1.5 inch (3.8 cm) diameter lined hose. Thus an additional benefit is that the pumping efficiency is increased at capacity.

I claim:

1. An additive metering system for dispersing a viscous fluid into a less viscous fluid which comprises:
    (a) a centrifugal pump having a suction inlet and at least one discharge outlet stage;
    (b) a first conduit connected to the suction inlet for intake of a less viscous fluid to which an additive viscous fluid is to be mixed;
    (c) a second conduit connected between the suction inlet and an outlet stage of the centrifugal pump;
    (d) a venturi mixer with an upstream and downstream side between the venturi provided in the second conduit such that fluid flow is towards the first conduit;
    (e) a third conduit connected into the downstream side of the venturi and adapted to draw fluid from a supply of a viscous fluid;
    (f) a fluid pressure responsive valve in the third conduit adapted for metering decreasing or increasing amounts of a viscous fluid in inverse relation to the pressure on a fluid pressure responsive means which moves a linearly slideable needle valve having a point taper angle between about 1° and 20° into an orifice for constricting fluid flow through the valve; and
    (g) a forth conduit connected between a pump outlet stage and the fluid pressure responsive means in the pressure responsive valve.

2. The system of claim 1 wherein a check valve is provided in the third conduit to prevent the reverse of fluid flow to the viscous fluid supply.

3. The system of claim 1 wherein a regulating valve is provided in the second conduit between the pump outlet and the venturi mixer for limiting the fluid flow from the pump.

4. The system of claim 1 wherein the outlet stage of the pump for the connection of the fourth conduit is the first stage.

5. The system of claim 1 wherein the fluid pressure responsive means is a flexible diaphragm.

6. The system of claim 1 wherein the orifice and needle point are found.

* * * * *

UNITED STATES PATENT AND TRADEMARK OFFICE
CERTIFICATE OF CORRECTION

PATENT NO. : 4,084,605
DATED : 1978 April 18
INVENTOR(S) : Norman C. Franz

It is certified that error appears in the above-identified patent and that said Letters Patent are hereby corrected as shown below:

Column 4, line 64, "100" should be --1000--.

Column 6, line 12, "forth" should be --fourth--.

Column 6, line 28, "found" should be --round--.

Signed and Sealed this

Fifth Day of September 1978

[SEAL]

Attest:

RUTH C. MASON
Attesting Officer

DONALD W. BANNER
Commissioner of Patents and Trademarks